(12) United States Patent
Neatherlin (10) Patent No.: US 10,155,467 B2
(45) Date of Patent: Dec. 18, 2018

(54) SYSTEMS AND METHODS FOR TRANSPORTING A STRUCTURE

(71) Applicant: Kenneth L. Neatherlin, Bryan, TX (US)

(72) Inventor: Kenneth L. Neatherlin, Bryan, TX (US)

(73) Assignee: GroundFORCE IP, LLC, Navasota, TX (US)

( * ) Notice: Subject to any disclaimer, the term of this patent is extended or adjusted under 35 U.S.C. 154(b) by 662 days.

(21) Appl. No.: 14/603,326

(22) Filed: Jan. 22, 2015

(65) Prior Publication Data

US 2015/0203020 A1 Jul. 23, 2015

Related U.S. Application Data

(60) Provisional application No. 61/930,415, filed on Jan. 22, 2014.

(51) Int. Cl.
*B60P 3/40* (2006.01)

(52) U.S. Cl.
CPC .................... *B60P 3/40* (2013.01)

(58) Field of Classification Search
CPC ...... B60P 3/40; B60P 3/41; B60P 3/32; B60P 1/64; B60P 1/6445; B62D 53/065; B62D 53/0821
USPC ...... 280/404, 425.2, 441.2, 43, 23; 414/458, 414/460, 461, 10–12
See application file for complete search history.

(56) References Cited

U.S. PATENT DOCUMENTS

| | | |
|---|---|---|
| 2,053,731 A | 9/1936 | Mussey et al. |
| 2,859,978 A | 11/1958 | Brimhall |
| 3,156,484 A | 11/1964 | Hughes |
| 3,193,301 A | 7/1965 | Talbert et al. |
| 3,243,193 A | 3/1966 | Bivins |
| 3,315,974 A | 4/1967 | Weaver, Jr. et al. |
| 3,438,652 A | 4/1969 | Hoffacker |
| 3,631,999 A | 1/1972 | Walerowski |
| 3,795,336 A | 3/1974 | Acker et al. |
| 3,834,111 A | 9/1974 | Acker et al. |
| 3,929,241 A | 12/1975 | Putnam |
| 4,199,298 A | 4/1980 | Webre et al. |
| 4,200,305 A | 4/1980 | Eubank |
| 4,231,709 A | 11/1980 | Corsetti |
| 4,320,607 A * | 3/1982 | Eubank ............... B60S 9/04 52/126.6 |
| 4,405,144 A | 9/1983 | Chambers |
| 4,452,555 A | 6/1984 | Calabro |
| 4,762,192 A | 8/1988 | Maxwell |
| 5,129,779 A | 7/1992 | Triplett |
| D480,857 S | 10/2003 | Wareham |
| 6,821,066 B2 | 11/2004 | Wehrli |
| 7,112,029 B1 | 9/2006 | Neatherlin |

\* cited by examiner

*Primary Examiner* — Anne Marie M Boehler
(74) *Attorney, Agent, or Firm* — Jones Walker, LLP (57) ABSTRACT

A system and method for lifting and moving a structure comprises at least two bolster assemblies configured to engage substantially opposing ends of the structure, a plurality of tensioned components extending between the bolster assemblies, applying a compressive force to clamp the bolster assemblies to the structure, and applying a lifting force to the bolster assemblies to lift the structure.

22 Claims, 8 Drawing Sheets

FIG. 9

SYSTEMS AND METHODS FOR TRANSPORTING A STRUCTURE

CROSS REFERENCE TO RELATED APPLICATIONS

This application is related to U.S. Provisional Application Ser. No. 61/930,415, filed on Jan. 22, 2014 and entitled "Bolster Assembly for Transporting A Modular Building Foundation and Methods of Use," the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not Applicable.

BACKGROUND OF THE INVENTION

Field of the Invention

The inventions disclosed and taught herein relate generally to systems and methods for lifting and transporting structures and components, such as, but not limited to, modular concrete foundations.

Description of the Related Art

U.S. Pat. No. 3,834,111 entitled "Method For Transporting Building Modules" purportedly discloses "A building module transporter for connection to a towing vehicle comprising a building module and module carriers attached to end walls of the module and resting on carrier supports. The carriers are firmly secured to the module at vertically spaced points to suspend the module between them and to permit the raising and lowering of the suspended module by pivoting the carriers about horizontal axes with respect to the supports. Means is provided for moving the module with respect to the carriers in a lateral direction to facilitate the precision alignment of the module with a foundation at the building site. The spaced connection points between the module and the carriers tension a lower portion of the suspended building and place an upper portion thereof in compression."

U.S. Pat. No. 4,200,305 entitled "Trailer assembly for carrying overwidth loads" allegedly discloses "A trailer assembly for carrying overwidth loads such as large rectangular concrete slabs. The trailer includes two separate units, a front unit and a rear unit. Each unit includes a frame mounted on a set of tandem wheels. The front unit has upper and lower frames rotatably connected together, allowing the wheels to turn with respect to the upper frame. A tongue is hingedly connected to the front unit. It has a hitch for connection to the towing vehicle and a compression device to apply weight to the hitch for compressive connection with the towing vehicle. Longitudinal cross members are mounted across the front and rear units to support the load. The cross members can be removed and stored parallel to the length of the units for legal width return trip towing. On return trip, the rear unit is towed reverse to the direction towed while loaded. Also disclosed is an embodiment employing two units the same or similar to the front unit to enable being moved laterally to facilitate parking in close space."

U.S. Pat. No. 7,112,029 entitled "Carrier Apparatus and Method" discloses "A carrier apparatus and method includes a pair of oppositely positioned carriers. At least one pair of steerable wheels is connected to at least one of the oppositely positioned carriers. A movable neck is connected to each of the oppositely positioned carriers and by compressive engagement to an object to be carried such that neither the movable neck, nor the pairs of steerable wheels, nor the pair of oppositely positioned carriers are underneath the object."

The inventions disclosed and taught herein are directed to improvements in systems and methods for lifting and transporting structures and components.

BRIEF SUMMARY OF THE INVENTION

As a brief summary of certain aspects of the inventions disclosed herein, a device for lifting and/or transporting a structure may comprise at least two bolster assemblies each configured to engage a lower portion of a structure to be lifted, and substantially opposite one another; at least one tension component configured to span between the bolster assemblies adjacent a lower portion of each bolster assemblies in a tensioned condition; each bolster assembly comprising at least one attachment point configured to engage a lifting assembly; and a lifting assembly for each bolster assembly comprising at least one force actuator configured to apply a force to the bolster assembly, the applied force creating a compressive force between an upper portion of the bolster assembly and the lower portion of structure to be lifted and increasing the tensioned condition in the at least one tension component.

As another brief summary of certain aspects of the inventions disclosed herein, a method for lifting and/or transporting a structure may comprise engaging a first external bolster assembly to an end of a structure to be lifted; engaging a second external bolster assembly to another end of a structure to be lifted; spanning at least one tension component between the first and second bolster assemblies; applying a predetermined tensile force to the at least one tension component; locking the at least one tension component to the bolster assemblies to retain the tensile force; applying a predetermined force to at least one of the bolster assemblies to clamp the structure to be lifted between the first and second bolster assemblies and substantially prevent relative vertical movement between the structure to be lifted and the bolster assemblies; and lifting the structure off of the ground by applying a lifting force to the bolster assemblies.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

We hereby incorporate for all purposes the full specification and drawings set forth in U.S. Pat. No. 7,112,029 entitled "Carrier Apparatus and Method," including, without limitation, FIGS. 111 and column 2, line 17 through column 8, line 31.

In general, the inventions for which protection is sought comprise systems and methods for lifting and transporting structures and components such as those structures and components having compressive strength, but little tensile strength. For example, one aspect of the inventions optionally comprises first assemblies, e.g., two, that can be formed into or attached to one end of the structure's lower portion, base or foundation. Second assemblies, for example one or more of the bolsters described herein, may be configured to removably or detachably engage the first assemblies (or the structure if first assemblies are not used). The second assemblies may be connected together with one or more tension component, preferably located adjacent the bottom one-half of the second assemblies. The second assemblies also comprise lifting and compressing components configured to interface with a lifting and transporting device, such as one or more of the bogeys described herein. A lifting and transporting device may attach to each second assembly and apply a compressing force to the structure, preferably adjacent the top portion of the second assembly to further clamp the structure and prevent or reduce vertical movement between the structure and the second assemblies. Once the compressing force has been applied by the lifting and transporting device, the structure may be lifted and transported.

Another aspect of the inventions comprises adjustably lifting the structure to heights ranging between about 5 inches to about 15 feet above the ground, and preferably from about 5 inches to about 4.5 feet to allow transport over most roadways and roadway crossings.

Another aspect of the inventions comprises one or more motorized, steerable bogeys configured to attach to an assembly on the structure for lifting and moving the structure. The bogeys may be controlled by wired remote or wireless remote.

Another aspect of the inventions comprises an information reader coupled to the bogey to read information embedded in the structure. For example, an RFID chip, passive antenna, near field chip, or other information device may be embedded in the structure and provide information concerning the structure, such as, but not limited to, weight of the structure, length, width, height and other properties. Additionally or optionally, the information may include details on the manufacture of the structure, such as can be used to move the unfinished structure around a construction facility in a desired order. The bogey or bogey controller can read the information embedded in the structure for purposes of, for example, lifting and transporting the structure. As further example, the length and/or width of the structure can be used by the controller to execute turns around obstacles.

The inventions disclosed herein are adaptable for use with all kinds of structures that need to be lifted and transported. For example, and not for limitation, "structures" may include oilfield components, equipment sleds, transportation containers, or any other physical structure having compressive strength and little tensile strength. For convenience and clarity only, Applicant has chosen to disclose these inventions in the context of mobile, modular housing units having a concrete-based foundation having little tensile strength. It will be understood and appreciated after having the benefit of this disclosure that the inventions taught herein and the protection sought for these inventions is not limited to the modular housing industry or housing units as the structure lifted and transported.

Figure 1:
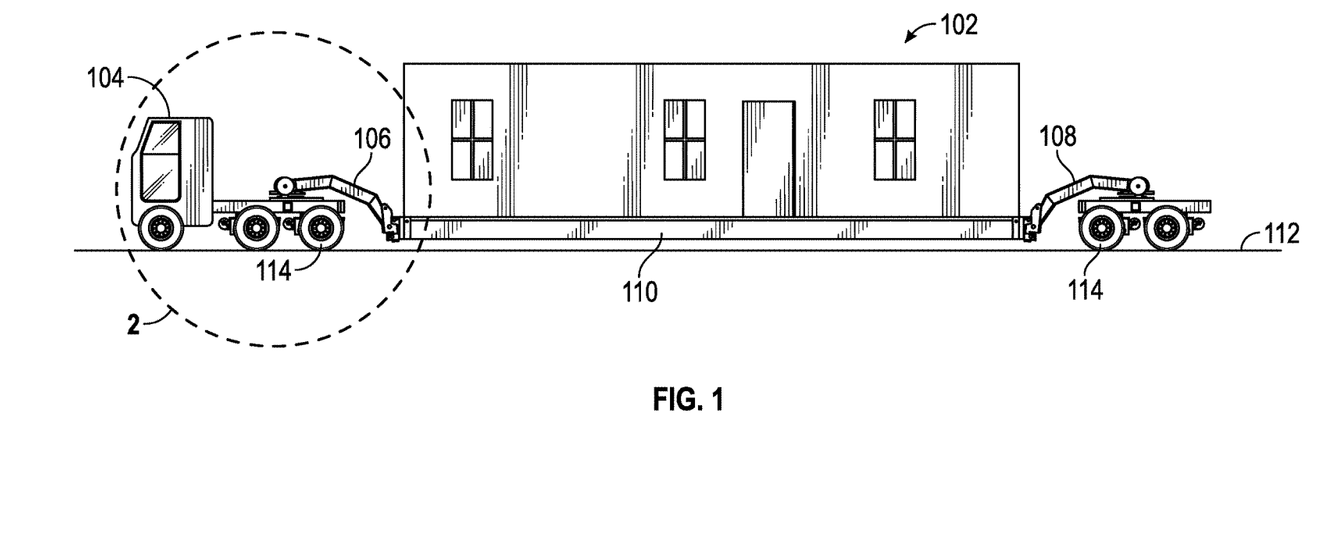
FIG. 1 illustrates a side view of the present inventions being used to transport a modular housing unit having a concrete-based foundation.

Turning now to discuss one of the many possible specific embodiments utilizing the inventions for which protection is sought, FIG. 1 discloses a modular housing unit 102 is illustrated being transported by a conventional highway tractor 104. A first roadway bogey 106 and a second roadway bogey 108 are shown engaged to the modular housing unit 102 as will be described herein. It will be noted that the modular housing unit 102 foundation 110 may be transported at a height above the roadway surface 112 that is substantially less than the height above the roadway if the housing unit 102 was placed above the wheels and tires 114. It will be appreciated that a lower is transport height allows the structure, such as modular housing unit 102, to be transported to locations and along roadways that would be prohibited with a taller load. The bogeys 106 and 108 may be configured, as discussed herein, to adjust the height of the structure to about 4 feet, 6 inches to clear ditches, railroad crossings and other roadway obstacles.

Again, it is important to understand that while FIG. 1 and other figures are illustrated with a modular housing unit 102 as the structure, the present inventions may be used, and preferably are used, with and for an unlimited number and type of structures in which direct lifting would cause failure or damage because of the lack of sufficient tensile strength in the structure's base or foundation. The present inventions are not and shall not be limited to use with modular housing units 102 and the like unless specifically and expressly limited by the claims.

Figure 2:
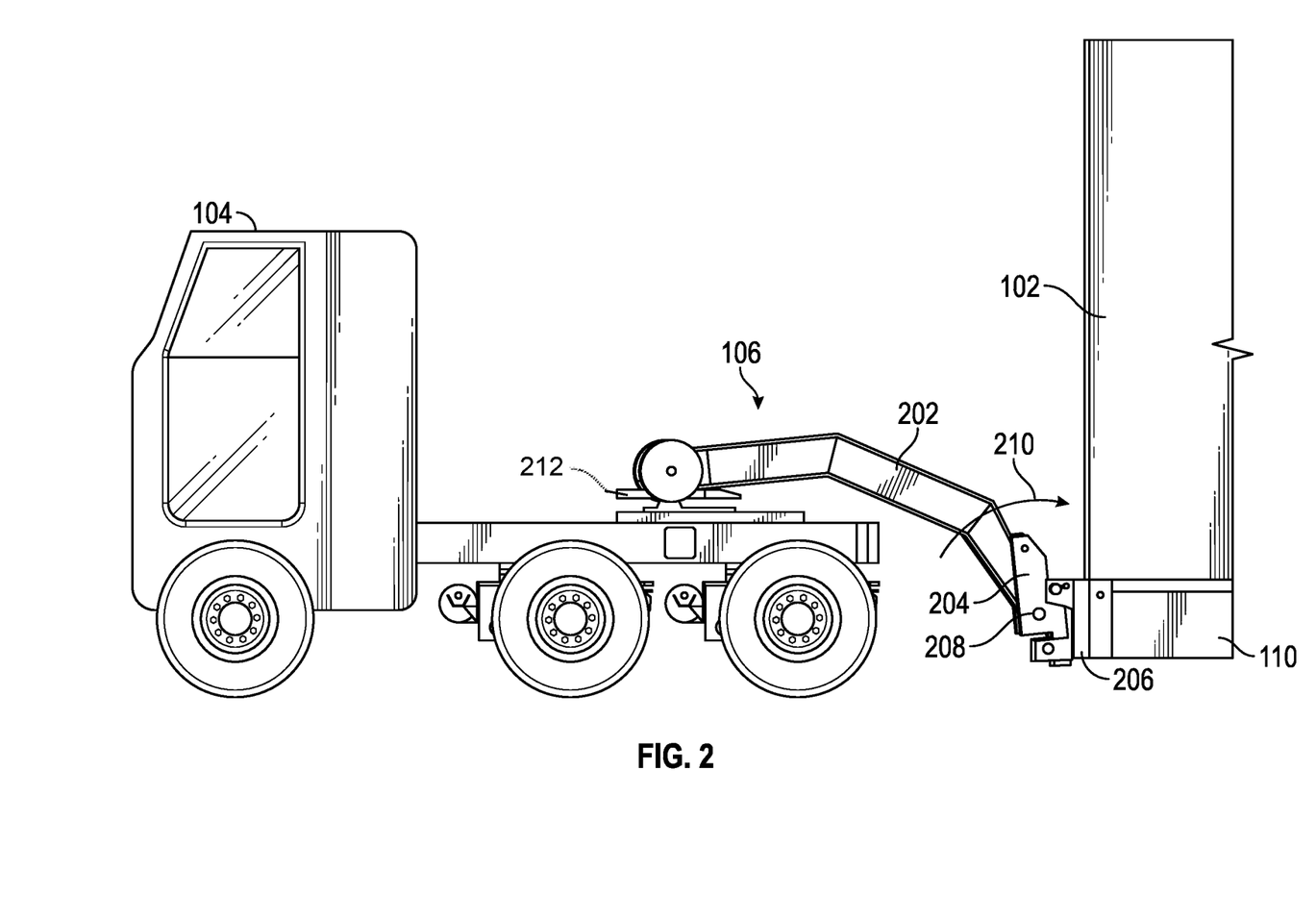
FIG. 2 illustrates a closer view of one end of the embodiment shown in FIG. 1

FIG. 2 illustrates a closer view of the interaction of the first bogey 106 and the structure 102. The bogey 106 may comprise a reaction assembly 202 or frame, typically and preferably fabricated from structural or alloy steel and configured at one end to operatively engage a wheeled component, such as a highway tractor 104. The frame 202 is configured at another end with one or more pick-up arms 204 configured to operatively engage a bolster assembly 206 attached to the structure 102, such as attached to the foundation 110 of modular housing unit 102.

The reaction assembly 202 and pick up arms 204 articulate relative to one another at pivot point 208. Force actuators, such as hydraulic cylinders, linear motors and other prime movers, (not shown) coupled to the frame 202 provide the force to rotate the pick-up arm 204 as shown by arrow 210 to provide a compressive force to the structure 102 (e.g., foundation 110), and to lift the structure 102. The same or additional force actuators also provide the force required to lift the structure.

The bogey 106 may comprise a swivel attachment 212 configured to couple the frame 202 to the tractor 104, to react the lifting forces applied by the force actuators, and to allow the frame 202 to rotate relative to the tractor 104. The range of rotation allowed by the swivel 212 may be up to about 270 degrees and preferably up to about 180 to about 200 degrees. In addition to allowing the frame 202 to rotate relative to the tractor 104, the swivel attachment 212 may allow the frame 202 to translate substantially parallel to the tractor's wheel axes. Such translation allows minute steering corrections and allows minute adjustments in placement of the modular housing unit 102, such as on foundation piles.

Figure 3:
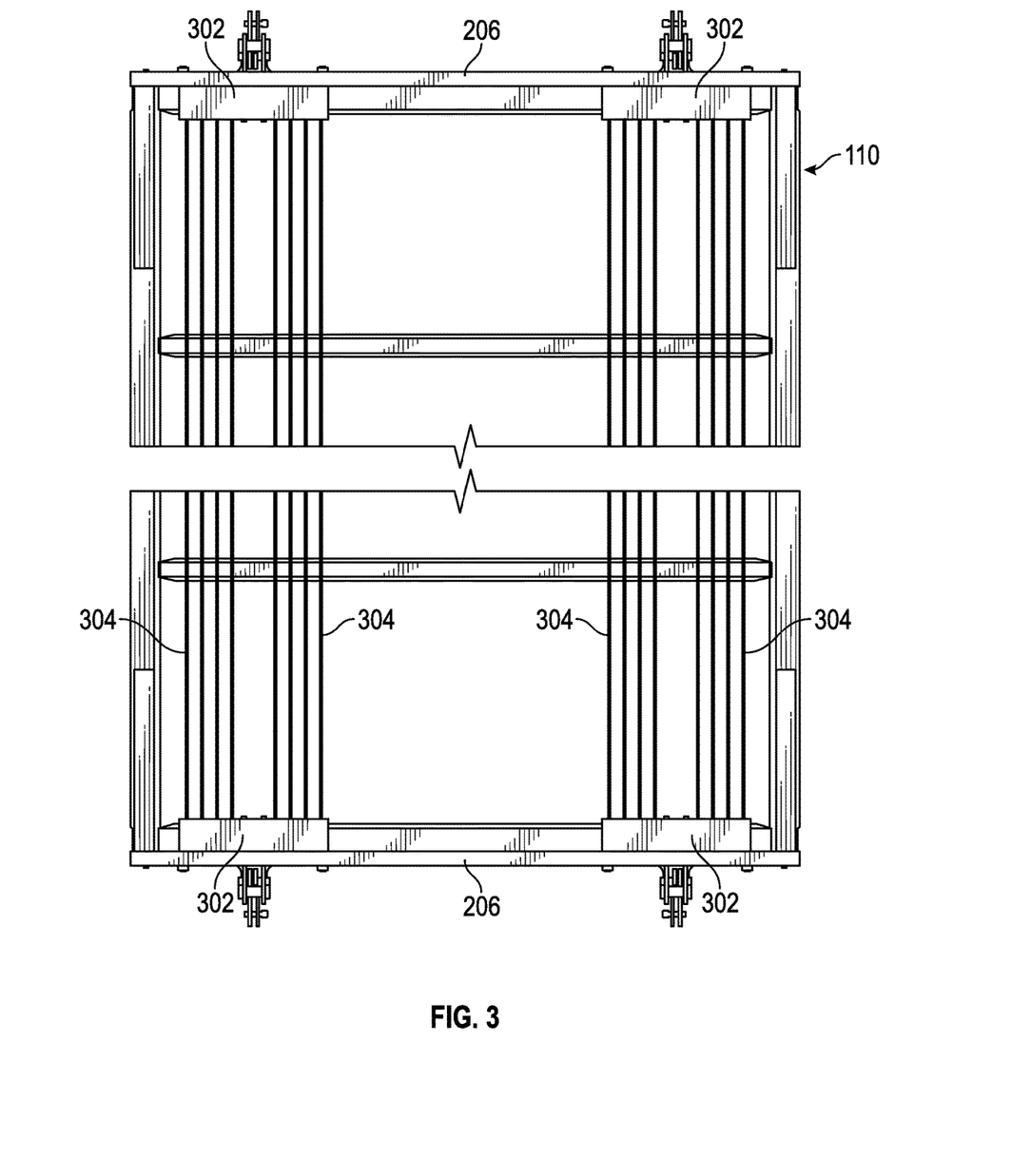
FIG. 3 illustrates an underside view of the modular housing unit shown in FIG. 1 according to the present inventions.

FIG. 3 illustrates, in quasi-transparent view, the interaction of bolsters 206 and structure 110, 102. As discussed in more detail below, bolsters 206 may comprise a plurality of detachable or removable tension boxes 302, and preferably two tension boxes 302 for each bolster 206. Each tension box is configured to capture and react at least one and preferably a plurality of tension components 304. As illustrated, the system shown in FIG. 3 comprises sixteen (16) tension components 304, which preferably are high strength, ½-inch diameter wire ropes. It will be appreciated that the tension components 304 may be wire cable, composite cable, rods, chains, all-thread, and other such components that may be placed in tension and which will retain such tension, or a portion of such tension over time. Preferably, wire cable or rope, including stainless steel cable, or coated steel cable are used as tension components 304.

Figure 4:
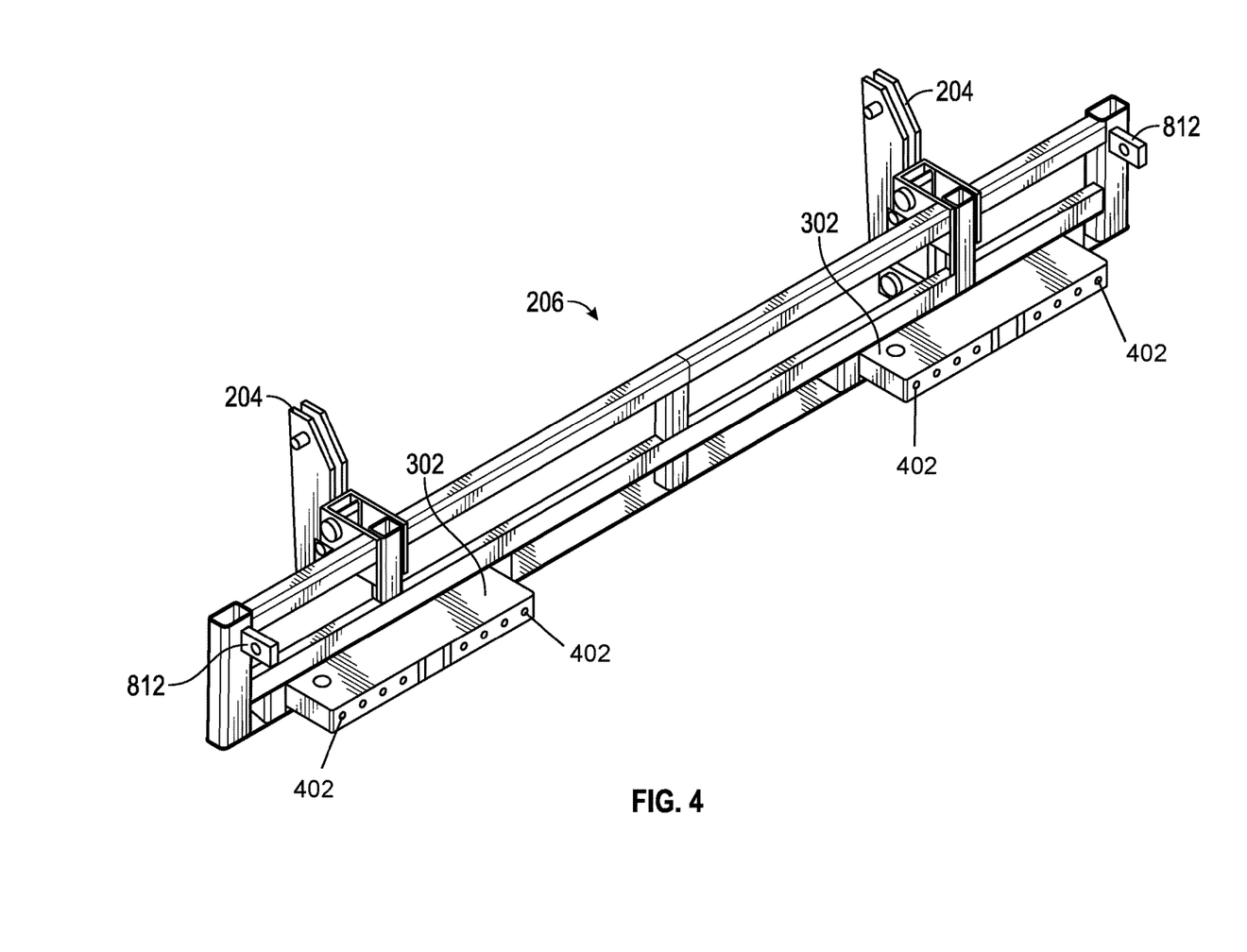
FIGS. 4 & 5 illustrate perspective views of one of many possible embodiments of a bolster assembly with pick up arms engaged, according to the present inventions.
Figure 5:
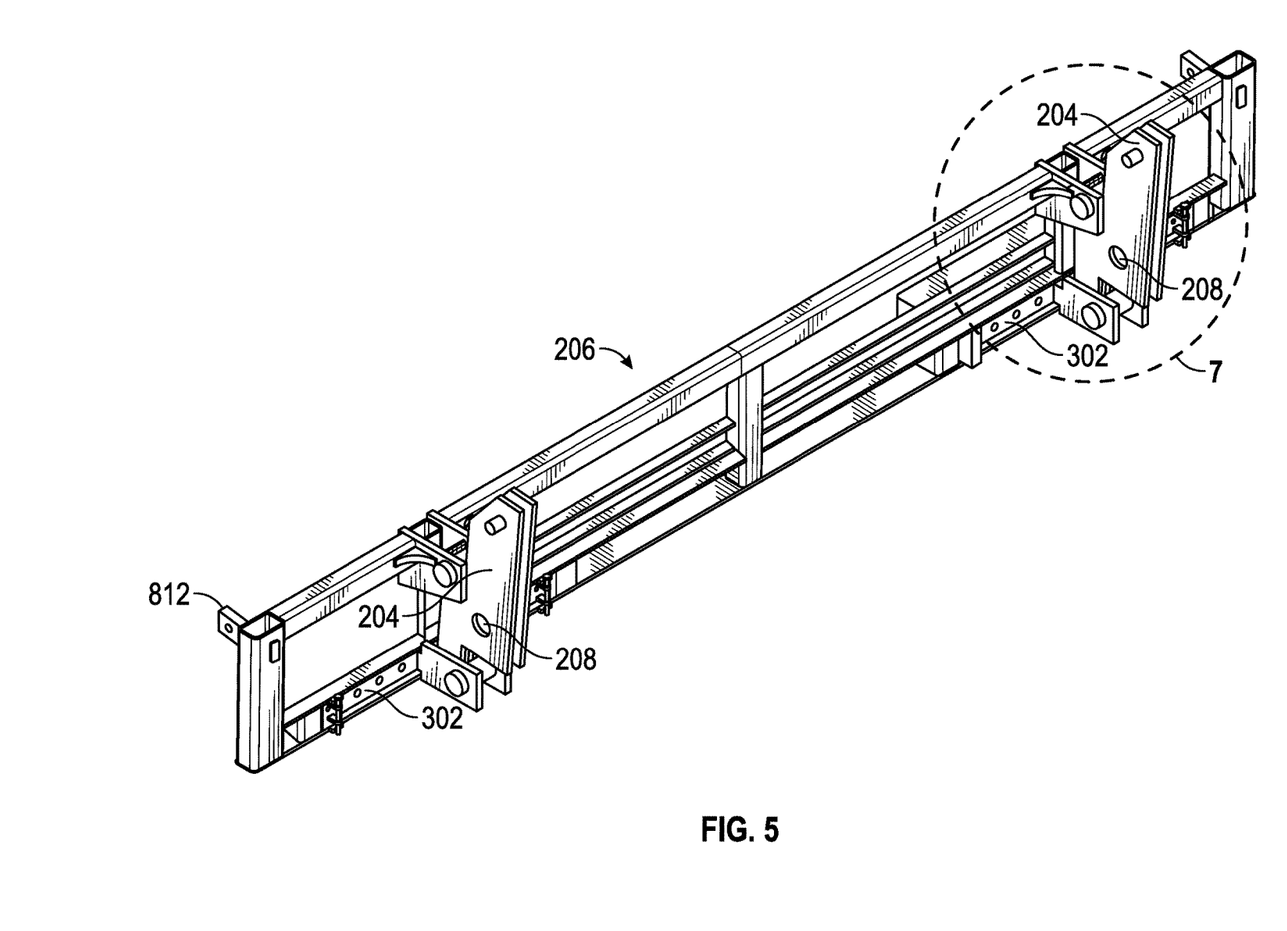

FIGS. 4 and 5 illustrate one of many embodiments of bolsters 206 that may be used with the present inventions. In these views, the tension boxes 302 are clearly shown as well as the 16 apertures 402. The tension boxes may be configured to slidably engage a portion or region of the bolster 206, and comprise a detachable lock or other structure to react the forces generated by the tension components 304 to the bolster 206. It will be appreciated that when the preferred steel wire rope are used as tension components 304, external tensioning devices (not shown) and wire rope termination fittings (not shown) may be used to attach the tension components 304 to the tension boxes 302 and hence bolster 206. Each aperture 402 in the tension boxes may comprise a wedge or cone-shaped socket to receive a wedge or cone-shaped compression grip for securing the tension components 304.

Figure 6:
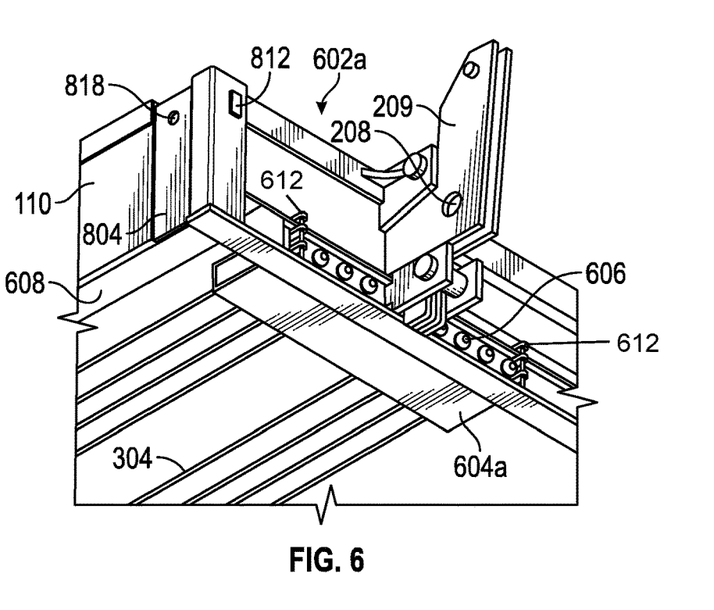
FIG. 6 illustrates a perspective end view of a bolster assembly with a pick up arm engaged, according to the present inventions.
Figure 8:
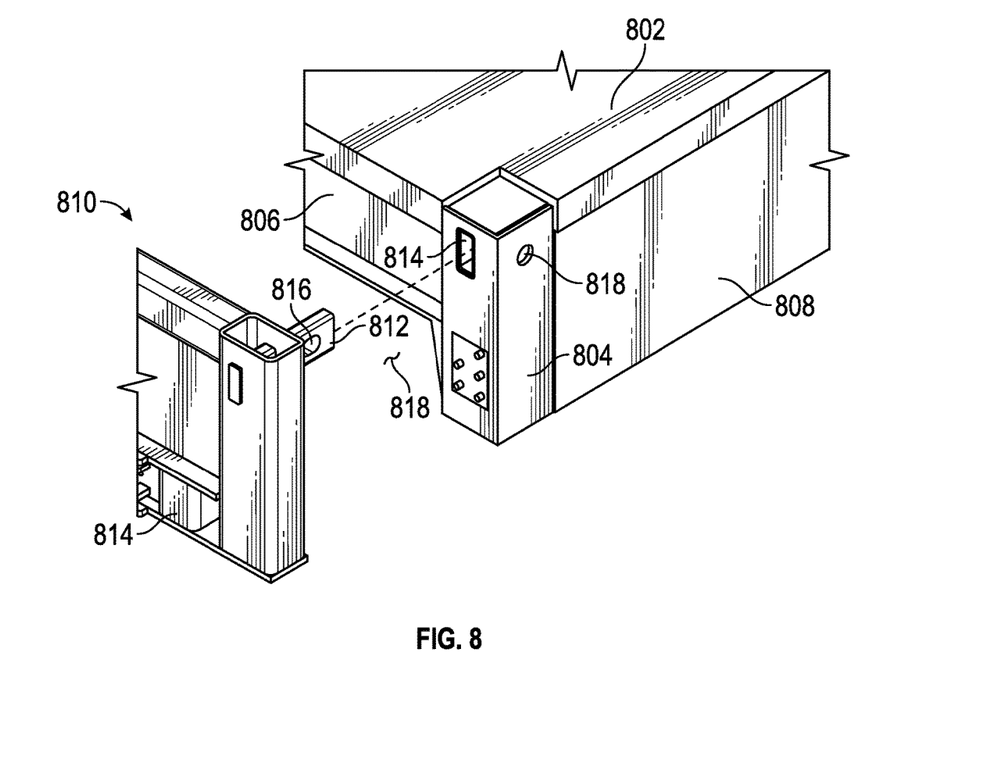
FIG. 8 illustrates a perspective view of one of many possible embodiments of a bolster engaging a structure, according to the present inventions.

For example, and with particular reference to FIG. 6, once a bolster assembly 602a has been engaged to a structure, such as foundation 110, the bolster 602a may be held in place and position by pins (not shown) placed in holes 818 to engage tongues 812 (refer to FIG. 8). Thereafter, a plurality of tension components 304, preferably high alloy steel wire rope, may be threaded beneath the structure 110 from one bolster assembly 602a to the other bolster assembly 602b at an opposite end (not shown in FIG. 6) for tensioning and attachment thereto.

With respect to the embodiment shown in FIG. 1, and with reference to FIG. 6, a length of wire rope 304 may be threaded through an aperture in the tension box 604a associated with the bolster 602a and any of a number of known wire rope termination fittings 606, such a swage fitting or removable compression fitting, may be applied to the end of the wire rope 304 to retain it in the tension box 604a. The wire rope 304 then may be threaded under the structure 110 to the other bolster 602b and threaded through a corresponding aperture in tension box 604b. Also shown in FIG. 6 are detachable tension box locks 612. It will be appreciated that when these locks, such a pin and flange lock, are engaged the tension components cannot pull the tension boxes 604a away from the bolster 602a, and react the tensile load to bolster 602a. It will also be appreciated that when the locks 612 are disengaged or opened, the tension boxes 604a will slide away from the bolster 602a and the tension box/tension components can be removed from the bolster 602a.

A tensioning device (not shown), such as a hydraulic ram, may grip the wire rope 304 that extends from the bolster 602b and may apply a predetermined level of tension (i.e., force) to the wire rope. While maintaining the desired level of tension, a second termination fitting 606 may be applied to the wire rope 304 to react against the tension box 604b and thereby maintain the applied tension in wire rope 304. This process may be repeated for the desired number of tension components 304 for structure 110. Alternately, all 16 tension components may be tensioned and attached simultaneously.

Using the modular housing unit 102 illustrated in FIG. 1 as a specific example, the structure 102 has a weight of about 35,000 $lb_f$ and is about 15 feet wide by about 48 feet long. The foundation 110 on which the structure is built is concrete based, and is nominally about 3 inches thick with 12 inch transverse beams and 20 inch side is beams 608. It will be appreciated that these skirts 608 provide an interior cavity on the underside of the foundation 110 for locating the tension components 304 of the present inventions. In other words, the optional skirts allow the structure to be placed on the ground without contacting the tension components. For this particular application, it was desired to use 16, ½-inch wire rope cables as the tension components 304, each tensioned to about 2,500 lb$_f$. It has been found that for lifting and transporting concrete based structures with the present inventions, the tension components may be loaded in a range of about 5% to about 50% of the structure's weight, and preferably in a range of about 10% to about 25% of the structure's weight. While this is a rule of thumb, it can be used to select the size and number of tension components. Also, the number of tension components 304 that may be used will depend on the design of the bolsters 206, 602, and the size and weight of the structure.

Figure 7:
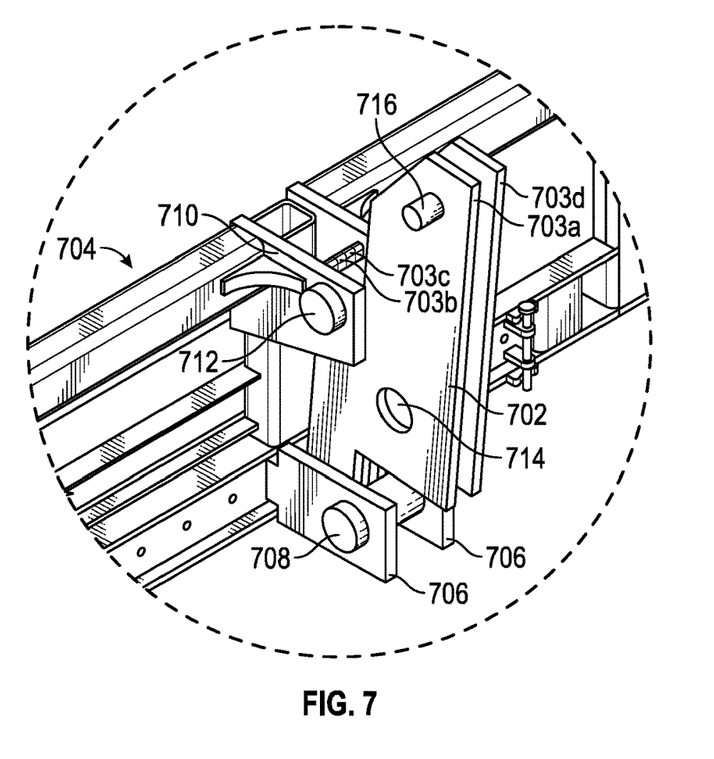
FIG. 7 illustrates a close-up perspective view of one of many potential embodiments of a pick-up arm engaged to a bolster, according to the present inventions.

FIG. 7 illustrates one of many possible embodiments of a pick-up arm 702 that may be used with the type of bolsters illustrated in FIGS. 4, 5 and 6. First, it will be seen that bolster 704 may comprise tension ears 706 and associated pins 708, and lifting ears 710 and associated lifting pins 712. The pick-up arm 702 may comprises a plurality of steel plates 703a-703d. It will be noted in this particular embodiment of pick-up arm 702, plates 703b and 703c are smaller than main plates 703a and 703d. Plates 703b and 703c establish the width of pick-up arm 702 and provide additional load-bearing area for reacting against lifting pin 712 and pin 708. Tension pin 708 may be fixed or removable from tension ears 706. Lifting pin 712 is preferably removable to aid placement and engagement of pick-up arm 702 in bolster 704.

Pick-up arm 702 also comprises a pivot hole 714 configured to receive a pivot pin associated with a lift and transport bogey (not shown in FIG. 7). It will be appreciated that pick-up arm 702 is configured to move, such as rotate, relative to the bogey. Pick-up arm 702 also comprises a force actuator attachment component 716 for attaching one or more force actuators, preferably a hydraulic ram (not shown in FIG. 7). Each bolster 704 comprises at least one pick-up arm 702, and preferably two pick-up arms 702. Of course, depending on the size and weight of the structure involved, a bolster may include 3 or more pick-up arms.

Figure 9:
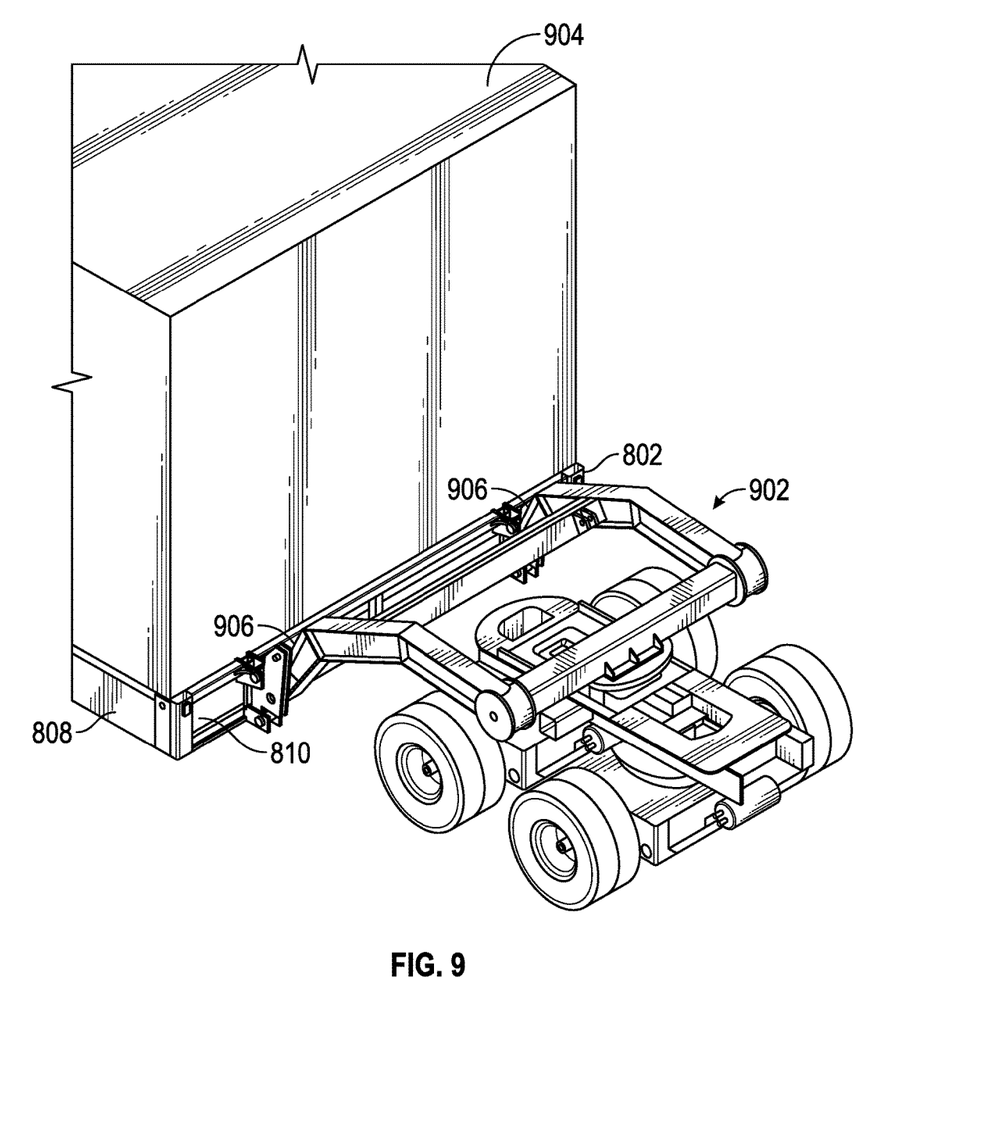
FIG. 9 illustrates a perspective view of a bogey attached to pick-up arms according to the present inventions for lifting and transporting a structure.

A bogey, such as those illustrated in FIGS. 1, 2 and 9, may be configured to engage the pick-up arms 702 at the bogey pivot point 714. One or more force actuators, preferably a hydraulic ram, associated with the bogey may be attached to the pick-up arms 702 for providing lifting and compressing forces to the structure. For example, and with reference to FIG. 1, force actuators on each bogey cause the actuator attachment point 716 on pick-up arms 702 to rotate relative to the pivot 714 and toward the bolster 704. This action creates a compressive force on the structure 110 adjacent the upper portion of bolster 704 and increases the tension in the tension components by reacting against tension pin 708. Those of skill having the benefit of this disclosure will appreciate that the mechanical advantage of the pick-up arm can be adjusted by changing the placement of pivot 714 relative to pin 712 and pin 708. It will be appreciated that the bolster 704 and bogey are configured to create a compressive clamping force on the structure for lifting the structure without inducing tensile loads in the structure that may cause structural damage. In other words, it is preferred that the bolster and tension components carry any tensile load.

In the example of FIG. 1, the compressive force created by the bolster 704 is applied adjacent the top surface of the foundation 110. Compressive pads, such as, but not limited to rubber pads, preferably are placed between the bolster 704 and the structure 110 to prevent or reduce damage that may be caused by the compressive force. It is desired that the compressive force be sufficient to "clamp" the structure to the bolster to prevent vertical movement of the structure relative to the bolsters during lifting and transport, without over-compressing and damaging the structure, or over-tensioning and damaging the structure.

Turning now to FIG. 8, during construction of a modular housing foundation 802, e.g., pouring, corner posts 804 may be formed therein at, preferably at each corner. It is preferred, but not required that corner posts 804 be fabricated from a metallic alloy, such as carbon steel, alloy steel, or stainless steel, and be preferably of a box or tube construction. Other materials may be used as desired or allowed. Optionally, a faceplate 806 of material similar to or different from corner posts 804 may is be employed to join at least two corner posts for structural integrity. As illustrated in FIG. 8, the faceplate 806 extends transversely to join corner posts 804, but does not extend longitudinally to join the other corner posts 804.

Also illustrated in FIG. 8 is bolster 810 according to aspects of the present inventions. The bolster 810 may be similar in design and function to the bolsters described previously and may be configured to engage foundation 802 at its transverse ends. As illustrated, bolsters 810 may comprise tongues 812 at each end, which are configured to engage corresponding grooves 814 in the foundation 802 corner posts 804. It is preferred, but not required that the tongues 812 comprise elongated apertures 816, such as elliptical holes to permit the bolster to move relative to the structure, such as during compression of by the bolster. It will be appreciated that bolster 810 is configured to engage the transverse end of foundation 802 and when the tongues 812 engage grooves 814, a pin or other retaining device (not shown) may be inserted into hole 818 to retain the sliding bolster 810 in position on foundation 802. As discussed previously, an impact absorbing material, such as a rubber product, may be, and preferably is positioned between the sliding bolster 810 and the transverse face of the foundation to reduce the chances of spalling or cracking the concrete foundation 802.

It is to be noted in FIG. 8 that foundation 802 preferably comprises a longitudinal skirt portion 808, which provides a protected area under the foundation 802 for the tension cables (not shown) discussed above. In practice, once the bolsters 810 are affixed to both transverse ends of the modular foundation 802, bogeys (see, e.g., 902 in FIG. 9) may be coupled to each sliding bolster 810 to lift and move the foundation.

In the context of a modular housing construction facility, the facility may have a track system, such as a rail system (not shown) that the bogeys 902 (see FIG. 9) engage to transport the foundation 802 to various housing construction sites within the factory. For example, and without limitation, the present inventions allow the foundation 802 to be lifted and moved to, for example, a framing station where the housing unit is framed on the foundation. After framing, the framed foundation may be lifted and moved to, for example an electrical station, where the electrical service is wired into the modular housing unit, and so forth. It will be appreciated that the present invention allows the foundation to be moved around the facility to the various construction stations to complete the fabrication of a modular housing unit, such as 102. After the modular housing unit 904 has been completed, it can be moved along the rail system to a loading station, where the housing unit can be lowered to the ground or floor and the facility bogeys 902 removed by detaching, e.g., the pivot pins 708 and force actuators 906

Transport bogeys 902, such as illustrated in FIGS. 1, 2 and 9, can be attached to lift the completed modular housing unit 904 and transport it along conventional roadways to a sale or use site. Once at the site, the modular housing unit may be lowered onto pilings or the ground for use or otherwise, and the bogeys removed. If the use of the modular housing will be semi-permanent or relatively long term, the bolsters and tension components may be removed, if desired. Alternately, and preferably, the bolsters and tension components may remain attached to the modular housing so that lifting and moving the unit merely require attaching bogeys with pick-up arms to the bolsters.

Regardless of whether the inventions described herein are used for movement in a yard, in a factory, on a roadway, or otherwise, the force actuators that provide the compressive clamping force and lifting force can be controlled manually and independently, or automatically and jointly. For example, in the construction factory described above, the hydraulic force actuators on each bogey may be plumbed together, such as by running hydraulic lines under the foundation 110 between each bogey. A control station may be provided at one or both bogeys configured to allow a single operator to apply a compressive force substantially simultaneously by each bolster. Once the appropriate clamping force has been applied, the control station may automatically energize the lifting actuators to lift the structure. Alternately, the control station may provide independent control of compressing and lifting. A wired or wireless remote module may be provided to control the bogeys from a distance. Additionally, one or more of the bogeys may comprise motors to provide torque to the bogey wheels to actually move the lifted structure. Independent control of the speed of rotation of the tires may be used to enable steering of the bogeys. Other forms of steerage control may be used.

Other and further embodiments utilizing one or more aspects of the inventions described above can be devised without departing from the spirit of Applicant's invention. For example and without limitation, rather than locating the tension components under the structure, the tension components may be located on the sides of the structure. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of lifting a structure, comprising:
    engaging a first external bolster assembly to an end of a structure to be lifted;
    engaging a second external bolster assembly to another end of the structure to be lifted;
    spanning at least one tension component between the first and second bolster assemblies;
    applying a predetermined tensile force to the at least one tension component;
    locking the at least one tension component to the bolster assemblies while applying the predetermined tensile force ;
    removing application of the predetermined tensile force after locking the at least one tension component to the bolster assemblies to retain a tensile force in the at least one tension component;
    applying a predetermined force to at least one of the bolster assemblies to clamp the structure to be lifted between the first and second bolster assemblies and substantially prevent relative vertical movement between the structure to be lifted and the bolster assemblies; and
    lifting the structure by applying a lifting force to the bolster assemblies.

2. The method of claim 1, further comprising attaching a wheeled bogey to each bolster assembly, and moving the lifted structure from a first location to second location.

3. The method of claim 2, wherein at least one of the wheeled bogeys comprises a prime mover to provide motion and directional control to the lifted structure.

4. The method of claim 2, comprising transporting the lifted structure on a roadway.

5. The method of claim 1, wherein the structure has compressive strength, but little tensile strength.

6. The method of claim 5, wherein the structure comprises concrete.

7. The method of claim 6, wherein the structure comprises reinforced concrete.

8. The method of claim 1, wherein one or more of the applied tensile, clamping, or lifting forces are provided by hydraulic rams.

9. The method of claim 1, wherein the first and second bolster assemblies are removable from the structure.

10. The method of claim 9, comprising removing the bolster assemblies and tension components after moving the lifted structure to a desired location.

11. The method of claim 1, wherein the at least one tension component comprises a plurality of wire rope segments extending between the first and second bolsters and are locked thereto in tensioned arrangement.

12. The method of claim 1, wherein compressible padding is placed between each bolster assembly and the structure.

13. A method of lifting a structure, comprising:
    engaging a first external bolster assembly to a first end of a structure to be lifted;
    engaging a second bolster assembly to a second end of a structure to be lifted;
    securing at least a first tension box to the first bolster assembly;
    securing at least a second tension box to the second bolster assembly;
    spanning at least one tension component between the first and second tension boxes;
    applying a predetermined tensile force to the at least one tension component;
    locking the at least one tension component to the tension boxes to retain a tensile force in the tension component;
    applying a predetermined force to at least one of the bolster assemblies to clamp the structure to be lifted between the first and second tension boxes and substantially prevent relative vertical movement between the structure to be lifted and the bolster assemblies; and lifting the structure by applying a lifting force to the at least one bolster assembly.

14. The method of claim 13, further comprising attaching a wheeled bogey to each bolster assembly, and moving the lifted structure from a first location to second location.

15. The method of claim 13, wherein the structure has more compressive strength than tensile strength.

16. The method of claim 15, wherein the structure comprises concrete.

17. A method of lifting a structure, comprising:
attaching a first external bolster assembly to an end of a structure to be lifted;
attaching a second external bolster assembly to another end of the structure to be lifted;
spanning at least one tension component between a lower portion of the first and second bolster assemblies;
applying a predetermined tensile force to the at least one tension component;
locking the at least one tension component to the bolster assemblies to retain at least some of the tensile force thereby clamping the structure to be lifted between the first and second bolster assemblies;
removing application of the predetermined tensile force after locking the at least one tension component;
engaging a lifting arm to each bolster assembly;
applying a predetermined force to at least one of the bolster assemblies through the lifting arm to substantially prevent relative vertical movement between the structure to be lifted and the bolster assemblies; and
lifting the structure by applying a lifting force to the bolster assemblies through the lifting arms.

18. The method of claim 17, further comprising attaching a wheeled bogey to each bolster assembly, and moving the lifted structure from a first location to second location.

19. The method of claim 17, wherein the structure has more compressive strength than tensile strength.

20. The method of claim 17, wherein the first and second bolster assemblies are removable from the structure, and the at least one tension component comprises a plurality of wire rope segments extending between the first and second removable bolsters and are locked thereto in tensioned arrangement.

21. A method of lifting a structure, comprising:
engaging at least one bolster assembly to a first end of a structure to be lifted;
engaging at least one bolster assembly to a second end of the structure to be lifted;
securing a first tension box to the at least one bolster assembly engaging the first end;
securing a second tension box to the at least one bolster assembly engaging the second end;
spanning a tension component between the first and second tension boxes;
applying a predetermined tensile force to the tension component;
locking a tensile force in the tension component, which tensile force substantially remains after the predetermined tensile force is removed;
applying a predetermined force to the at least one bolster assemblies at each end to clamp the structure to be lifted between the bolster assemblies, and substantially prevent relative vertical movement between the structure to be lifted and the bolster assemblies; and
lifting the structure.

22. The method of claim 21, further comprising moving the structure while it is lifted.

* * * * *